United States Patent
Ambaljeri et al.

(10) Patent No.: US 10,284,507 B1
(45) Date of Patent: May 7, 2019

(54) MANAGING DATA PROTECTION SOFTWARE VIA EMAIL

(71) Applicant: EMC Corporation, Hopkinton, MA (US)

(72) Inventors: Mahantesh M. Ambaljeri, Bangalore (IN); Siddappa N. Ambiger, Bangalore (IN); Iresha R. Gadikar, Bijapur (IN); Mahesh Rao, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 137 days.

(21) Appl. No.: 14/327,699

(22) Filed: Jul. 10, 2014

(51) Int. Cl.
*H04L 12/58* (2006.01)

(52) U.S. Cl.
CPC .................................. *H04L 51/18* (2013.01)

(58) Field of Classification Search
CPC ............................. H04L 51/18; H04L 51/00
USPC ................................................ 709/224, 206
See application file for complete search history.

(56) References Cited

U.S. PATENT DOCUMENTS

| | | | | |
|---|---|---|---|---|
| 6,697,942 B1* | 2/2004 | L'Heureux | ............ | H04L 51/18 380/238 |
| 7,058,582 B2* | 6/2006 | Powell | ..................... | G06F 8/70 705/1.1 |
| 7,818,573 B2* | 10/2010 | Martin | ................. | G06Q 20/401 713/170 |
| 8,060,473 B1* | 11/2011 | Dhumale | ............ | G06F 11/1464 707/640 |
| 2008/0005380 A1* | 1/2008 | Kawasaki | ........... | G06F 11/1458 710/15 |
| 2008/0147625 A1* | 6/2008 | Altounian | ............ | G06Q 10/087 |
| 2008/0162923 A1* | 7/2008 | Arnold | ................. | G06Q 10/107 713/150 |
| 2010/0169590 A1* | 7/2010 | Gordon-Carroll | ......................... G06F 11/1451 711/162 | |
| 2011/0087348 A1* | 4/2011 | Wong | ...................... | H04L 12/58 700/94 |
| 2012/0054289 A1* | 3/2012 | Aytulu | ................. | G06Q 10/107 709/206 |

* cited by examiner

*Primary Examiner* — Nicholas R Taylor
*Assistant Examiner* — Meng Vang
(74) *Attorney, Agent, or Firm* — Dergosits & Noah LLP; Todd A. Noah

(57) ABSTRACT

Systems and methods for remotely operating a data protection server are described. The data protection server is configured to perform predefined data protection operations for computing assets of an enterprise network. An email agent is installed on the data protection system to receive a specially-coded email message from an authorized user, where the specially-coded message includes an instruction for performing a predefined data protection operation. Upon receiving the email message and parsing it to extract the instruction, the data protection system initiates execution of the instruction.

17 Claims, 4 Drawing Sheets

MANAGING DATA PROTECTION SOFTWARE VIA EMAIL

TECHNICAL FIELD

This disclosure relates generally to the field of data protection, and more particularly, to apparatus and methods for managing data protection operations by transmitting instructions via electronic mail.

BACKGROUND

A current software trend for electronic technology is flexibility, and in particular, making software products easily accessible and usable even from remote or portable devices. However, data protection software does not lend itself well to use on remote or portable devices. Typically, an administrator that is monitoring data protection operations does so from within the computing environment being protected, e.g., from a local computer terminal that is part of an enterprise network. Further, data protection software usually employs an LDAP/AD configuration (Light Directory Access Protocol/Active Directory) configuration where a single sign-on process allows the user to gain access to a corporate or enterprise intranet. Such a configuration limits the ability of the administrator to manage the data protection software from a remote or portable device.

It would be desirable to provide the ability for the administrator to manage the data protection software from a remote or portable device not located on the enterprise network.

DETAILED DESCRIPTION

Figure 1:
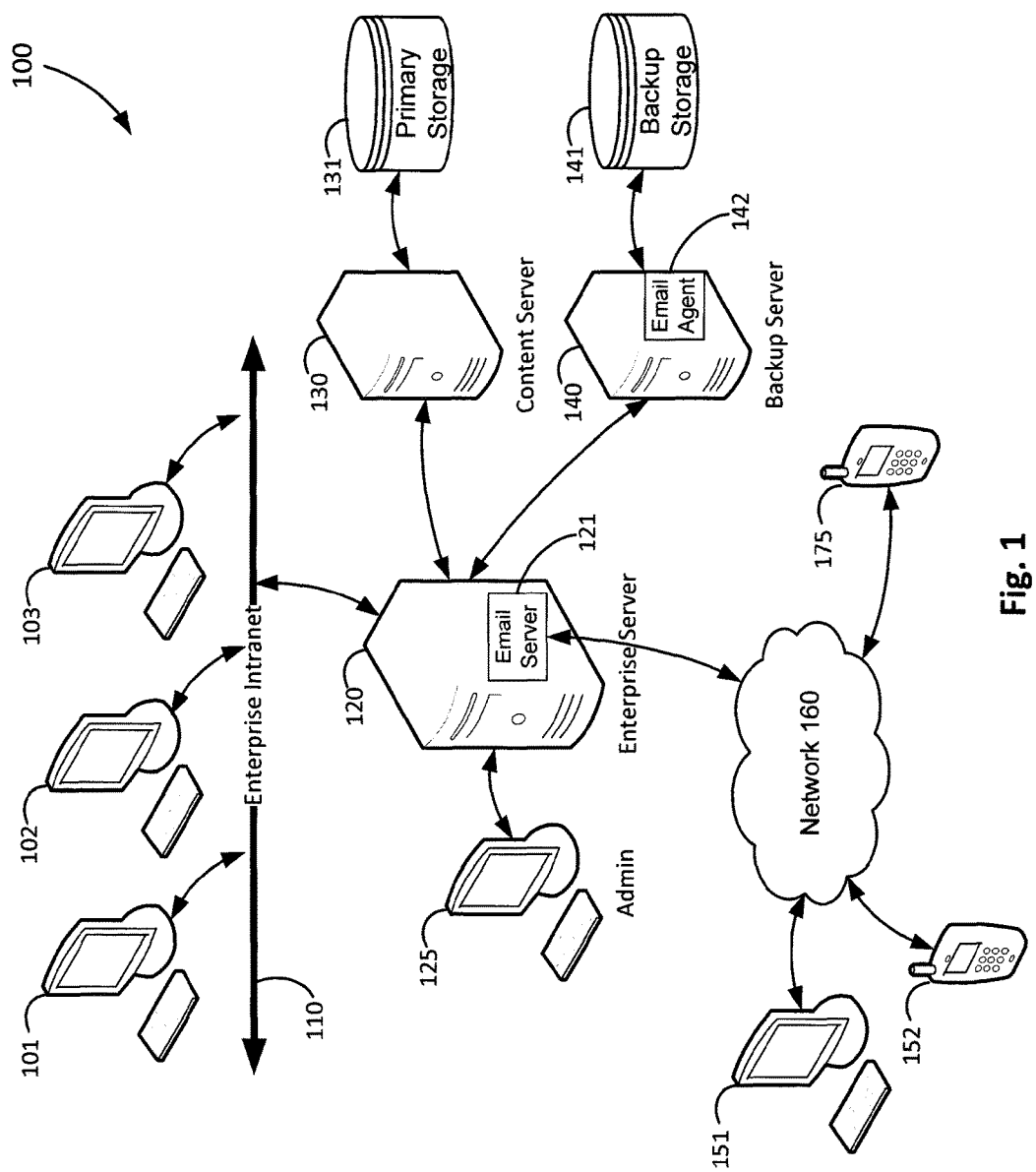
FIG. 1 is a block diagram of an enterprise system/network having an improved data protection system.

This disclosure describes an apparatus and methods for remotely operating a data protection system. The data protection system is configured to perform predefined data protection operations for computing assets of an enterprise network. In one embodiment, the data protection system includes an email agent having a recipient address in a domain associated with the enterprise network. Thus, the data protection system receives email messages via a message service of the enterprise network. The data protection system is further configured to receive, at the email agent, a specially-coded email message from an authorized user, wherein the specially-coded message includes an instruction for performing a predefined data protection operation. Upon receiving the email message, parsing the message, and extracting the instruction, the data protection system executes the instruction.

Embodiments are described herein which could be implemented in many ways, including as a process, an apparatus, a system, a device, a method, a machine-readable medium such as a computer-readable storage medium containing computer readable instructions or computer program code, or as a computer program product such as a computer-usable medium having computer-readable program code embodied therein.

A computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general purpose computer such that when the software is loaded into and/or executed by the computer, the computer becomes an apparatus for practicing an embodiment. Applications may also be downloaded in whole or in part through the use of a software development kit or toolkit that enables the creation and implementation of an embodiment. In general, the order of the steps of disclosed methods and processes may be altered within the scope of this disclosure.

1. Architecture of Enterprise Network

FIG. 1 illustrates an embodiment of an enterprise-level system 100. A number of client devices, such as computer terminals 101, 102, 103, communicate with an enterprise server 120 through a network 110. The network 110 is configured as an internal network for the enterprise, or intranet, although other configurations are possible. The enterprise server 120 is the host of the computing environment for the enterprise, and is configured with a number of applications and utilities for servicing the information needs of the enterprise. For example, the enterprise server 120 is configured with an email server module 121 that handles incoming and outgoing messages for the enterprise domain, although this function could be implemented in a separate machine that communicates with the enterprise server. The enterprise server 120 also provides other enterprise-level collaborative tools for its users, such as a calendar application, a word processing application, a spreadsheet application, a browser application, among others. Often, enterprise-level applications include a client part installed on the client device and a server part installed on the server device.

Each of the computer terminals 101, 102, 103 communicates with the enterprise server 120 in order to use one or more of the applications hosted on the enterprise. In one embodiment, the network 110 is an Ethernet connection using conventional TCP/IP communication methods with both client devices and server devices. However, other types of network connection technologies are well known and may also be used to full advantage, including local area network (LAN), wide area network (WAN), storage area network (SAN), the Internet, etc. Client devices may be any type of processor-based digital device, such as desktop or laptop computer, tablet, electronic notepad or mobile telephone such as a smart phone.

The data of the workgroup users is stored in one or more databases, for example, in a primary store 131 managed by a content server 130. The content server 130 runs a content management platform that is accessible through the enterprise server 120, or alternatively, is incorporated within the enterprise server. The primary store 131 may include discrete stores either on-site or off-site, for example, cloud storage, such as a file store for storing content items, a relational database for storing attributes/metadata associated with the content items, a full-text index store for the content items, and directory services. One example of suitable content management platform is the EMC Documentum software and related EMC Enterprise Content Management software, distributed by EMC Corporation, Hopkington, Mass. The Documentum Platform provides capabilities for managing enterprise content and is the foundation for related content management and case management product offerings.

The data is protected by a backup server 140, or data protection server, that provides backup, restore and archive functions for the data of the enterprise network 100, using backup store 141. The backup store 141 may include other discrete stores either on-site or off-site, for example, cloud storage. The backup server 140 runs a data protection platform that has restricted access available through the enterprise server 120, or alternatively, this function may be incorporated within the enterprise server. Examples of suitable data protection platforms include Avamar software and Data Domain software, both offered by EMC Corporation, Hopkington, Mass.

An administrative terminal 125 is provided for system operators to perform system tasks, such as maintenance, logging, access control, etc. In particular, the system operator may use the administrative terminal 125 to perform critical activities using the data protection software installed on the backup server 140, like starting backup and restore operations, configuring backup schedules, initiating maintenance activities, generating reports, etc. For example, the data protection software may generate a graphical user interface ("GUI") on the administrative terminal 125 that facilitates managing all aspects of the data protection process. Alternatively, the data protection software may run a web application via a browser program that is only available inside the enterprise network 100.

Users outside of the intranet, such as devices 151, 152, 175 may still get access to some functions of the enterprise server 120, such as email, over an external network 160, such as the Internet.

In this embodiment, the data protection server 140 also includes an email agent 142 that is configured as a regular email recipient in the enterprise domain to receive incoming messages via the enterprise email server 121. Thus, a system operator can compose and send an email message addressed to the data protection server 140. This feature can be utilized to send commands to the data protection server 140 from a remote location, e.g., external to the enterprise intranet, such as from device 175.

To reduce the load on the data protection server 140, an accessory server (not shown) may be employed having a low end configuration that can be used to host the email agent 142, as well as a utility for parsing the email message and initiating the command to the data protection software.

2. Sending Commands to the Data Protection Server Via Email

Figure 2:
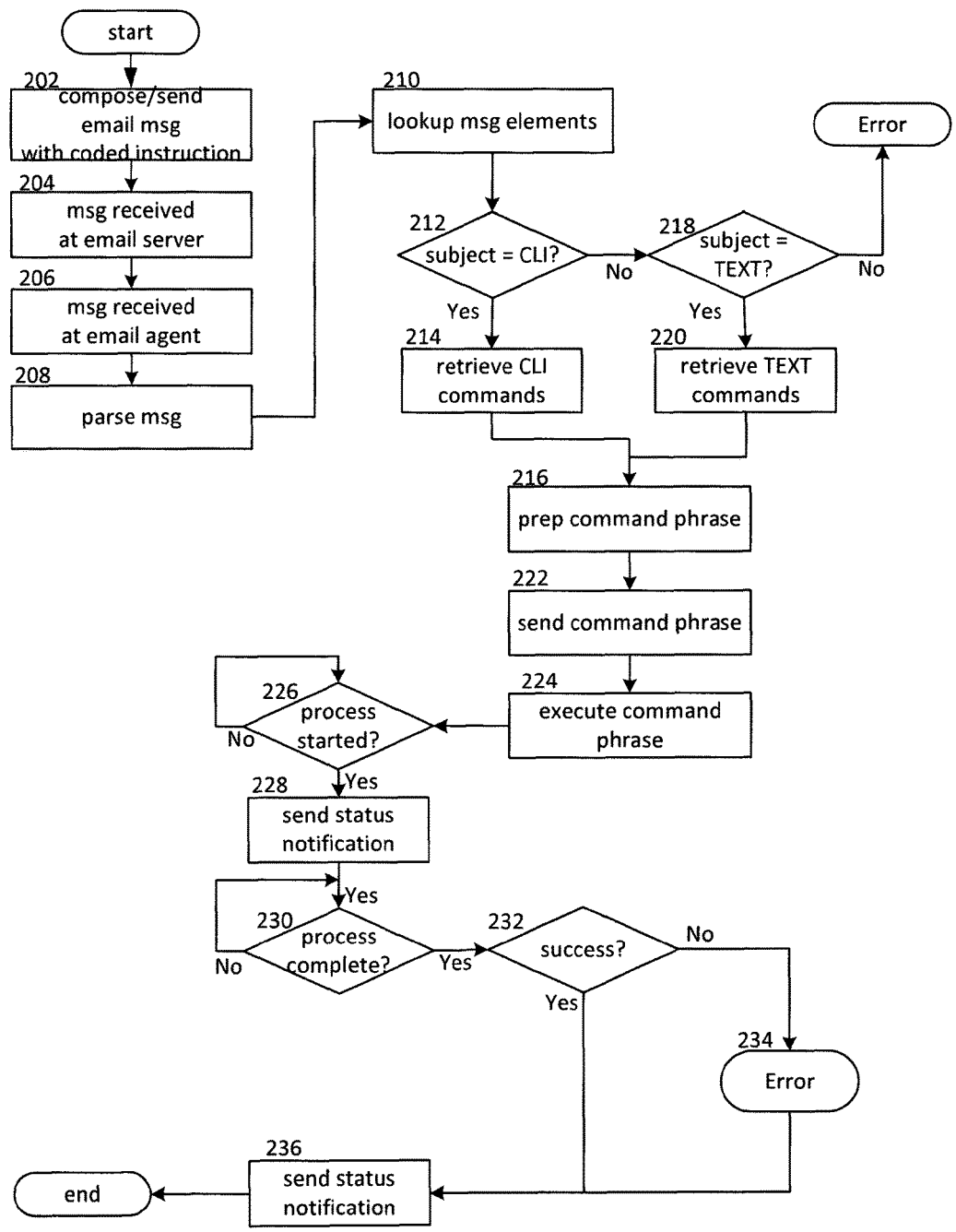
FIG. 2 is a flow diagram that illustrates a process for providing a command to the data protection system via email.

FIG. 2 illustrates a process 200 for remotely initiating a data protection operation at the data protection server 140 using an email message. For example, process 200 may be used start a backup or a restore operation, to configure backup schedules, to initiate maintenance activities, to generate reports, or to perform other defined data protection tasks.

In step 202, the administrator, using device 175, composes an email message addressed to the email agent 142. The email message includes a specially-coded message that includes instructions for initiating a data protection operation on the data protection server 140, as described below. The specially-coded message is from a list of plain text words or phrases that can be built on the backend into a data structure, such as a table or dictionary. Further, the data structure can be used to map plain text to the commands which the software understands. The plain text words or phrases can be chosen to be easily remembered, like natural language commands, and easily used.

The administrator and device 175 are located on an external network 160, such as the Internet, while the enterprise email server 121, the data protection server 140, and the email agent 142 for the data protection server are all located on the internal enterprise network 110. Thus, when the administrator hits the "send" button, the email message is transmitted through external network 160, where it is received at the enterprise email server 121 in step 204.

The enterprise email server 121 transmits the message to the designated recipient, i.e., the email agent 142, over the internal network 110 using standard messaging protocols, where the message is received at the email agent 142, in step 206.

In step 208, the email agent 142 parses the message into its individual message elements. For example, an application to parse the subject and body of the email message can be a part of the email agent 142, or provided as a separate utility, or otherwise installed to run and provide this feature on the data protection server 140. The message elements have a defined format wherein a first phrase is contained within the subject field of the message and identifies the instruction mode, and a second phrase is contained within the body of the message and identifies the instruction for the particular instruction mode.

Thus, in step 210, the individual message elements are cross-referenced to machine commands and their related parameters, for example, by performing a look-up of each message element in a data structure in order to construct a simple command phrase that will be understood by the data protection software. For example, the first phrase is used to interpret the second phrase.

More particularly, in step 212, if the first phrase (subject) is equal to "CLI," then the second phrase (body) is an actual command line instruction that is defined for and understood by the data protection software. Thus, in step 214, the routine will retrieve a list of command line instructions from a data structure that have been predefined for this purpose, i.e., to be used as a direct command in an email message with CLI as the subject. A command phrase is then prepared in step 216 to be executed by the data protection server.

Alternatively, if the first phrase is not equal to "CLI" in step 212, then if the first phrase (subject) is equal to "TEXT" in step 218, then the second phrase (body) is a plain text instruction that must be correlated to an actual command line instruction. For example, in step 220, a command that is correlated to the TEXT is retrieved from the data structure. The routine returns to step 216 to prepare a command phrase to be executed by the data protection server.

If the subject is not "CLI" in step 212 or "TEXT" in step 218, then an error is generated.

The data structure can be initialized to contain a list of relevant CLI and TEXT commands that correspond to valid instructions for the CLI and TEXT modes. Further, the instructions/commands can be indexed so that the plain text instructions provided by the administrator when composing the body of the message can be mapped to the appropriate instruction/command. The mapping is stored along with syntax and parameter requirements in a table, dictionary, or other known data structure.

In step 222, the command phrase is sent to the data protection server, and in step 224, the command is executed by the data protection server.

In step 226, if the data protection operation has started, then the data protection server 140 sends a notification to the email agent 142 in step 228 that the operation has been initiated. The email agent 142 can be configured to, upon receipt of such notification, automatically compose and send a status update email message to the designated administrator(s) to provide notice of the data protection operation initiated and its details. If the process has not started, then the routine loops back to step 226 until the operation has started.

If the data protection operation has completed in step 230, then the result will be a successor a failure (including a timeout). If the result is a success in step 232, then an appropriate status update message will be sent to the system administrator in step 236. If not, then if the result is a failure thus generating an error in step 234 and an appropriate status update message will be sent to the system administrator in step 236.

Figure 3:
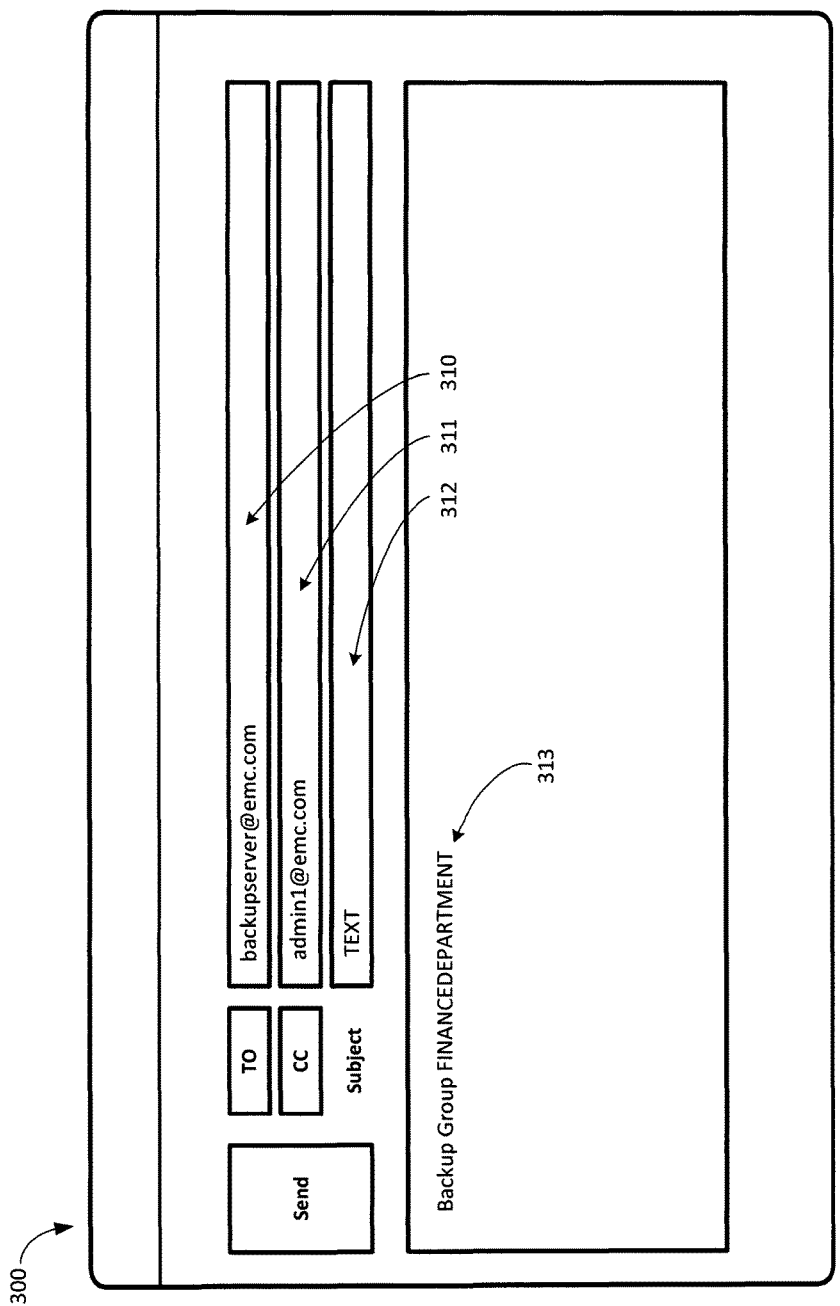
FIG. 3 illustrates an email message having a plain text instruction in the body of the message.

FIG. 3 illustrates one example of an email message 300 addressed in field 310 to <backupserver@emc.com>, with a copy addressed in field 311 to <admin1@emc.com>. The subject of the message in field 312 is "TEXT" and the body of the message in field 313 includes the plain text:

Backup Group FINANCEDEPARTMENT

When parsed, the subject "TEXT" indicates that the body includes a plain text message that must be correlated to a command phrase that is understood by the data protection software.

One example of a plain text syntax is:
BACKUP GROUP <group name/dataset>
Another example of a plain text syntax is:
BACKUP MACHINE <machine name> <file system path>

These and other common plain text syntaxes can be stored in a data structure along with the actual command syntax that the data protection server will understand. Upon looking up the plain text syntax in the data structure, a corresponding command will be generated using the parameters set forth in the plain text.

Figure 4:
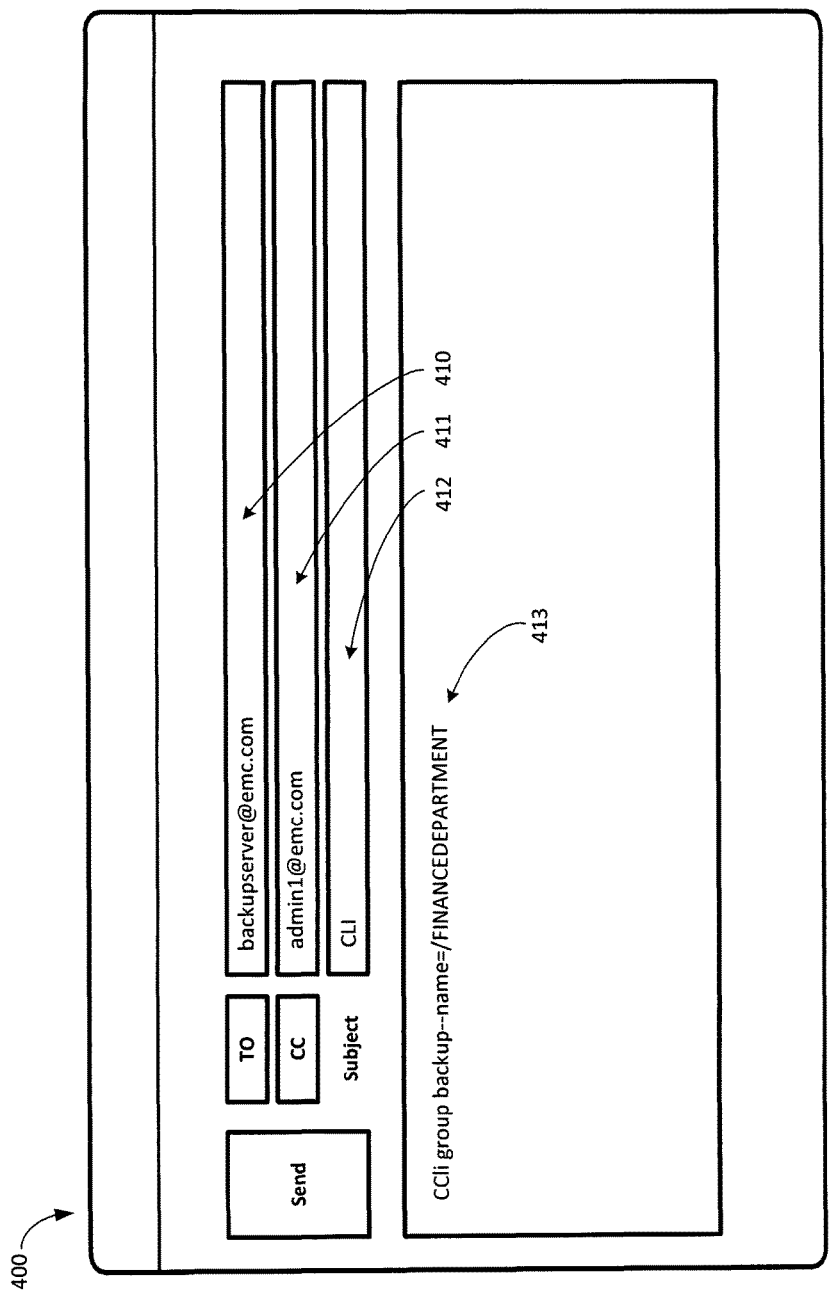
FIG. 4 illustrates an email message having a command instruction in the body of the message.

FIG. 4 illustrates another example of an email message 400 addressed in field 410 to <backupserver@emc.com>, with a copy addressed in field 411 to <admin1@emc.com>. The subject of the message in field 412 is "CLI" and the body of the message in field 413 includes actual command line instruction:

CCli group backup—name=/FINANCEDEPARTMENT

When parsed, the subject "CLI" indicates that the body includes an actual command phrase that is understood by the data protection software and may be used directly to control the operation of the data protection server. The actual CLI commands can also be stored in the data structure.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for controlling data protection operations on an enterprise network, comprising:

receiving, at an email agent of a data protection server of the enterprise network, a specially-coded email message from an authorized user via a device in a network external to the enterprise network, the specially-coded email message providing an instruction for performing a predefined data protection operation on computing assets in the enterprise network, the computing assets on the enterprise network being remote from the device used by the authorized user to transmit the specially-coded email message and the data protection server;

parsing, by the data protection server, the specially-coded email message to identify a first phrase in a subject field of the message and a second phrase in a body field of the message, the first phrase indicating one of a plurality of predefined instruction modes and the second phrase indicating the instruction for performing the predefined data protection operation, the instruction being one of a plurality of predefined instructions that are configured for the instruction mode;

initiating, by the data protection server, the predefined data protection operation on the computing assets based upon the instruction in the specially-coded email message; and sending, by the data protection server, a status update email message to one or more administrators when the data protection server initiates the predefined data protection operation.

2. The method of claim 1, further comprising:

parsing the first phrase in a subject field of the message to extract at least one first instruction element, and matching the first instruction element the one of the plurality of predefined instruction modes;

parsing the second phrase in a body field of the message to extract at least one second instruction element, and matching the second instruction element to the one of the plurality of predefined instructions that are configured for the instruction mode that corresponds to the first instruction element;

constructing a command phrase for the data protection server based on the predefined instruction corresponding to the second instruction element; and initiating the predefined data protection operation based on the command phrase.

3. The method of claim 2, further comprising:

initializing a data structure by storing the plurality of predefined instruction modes, and for each instruction mode, storing a corresponding plurality of predefined instructions.

4. The method of claim 3, further comprising:

storing in the data structure, for each predefined instruction, a command phrase that corresponds to the instruction.

5. The method of claim 3, further comprising:

identifying the predefined instruction mode as a command line instruction (CLI) command instruction mode, wherein the second instruction element is a command line instruction formatted for direct execution by the data protection server.

6. The method of claim 5, further comprising:
extracting the term "CLI" as the first instruction element, which identifies the CLI command instruction mode in the plurality of predefined instruction modes.

7. The method of claim 3, further comprising:
identifying the predefined instruction mode as a TEXT command instruction mode, wherein the second instruction element is a plain text instruction that must be interpreted by an application programming interface.

8. The method of claim 7, further comprising:
extracting the term "TEXT" as the first instruction element, which identifies the application programming interface (API) command instruction mode in the plurality of predefined instruction modes.

9. The method of claim 1, further comprising:
notifying the authorized user regarding a status of the selected data protection operation.

10. A computer program product comprising computer-readable program code to be executed by one or more processor when retrieved from a non-transitory computer-readable medium, the program code including instructions to:
receive, at an email agent of a data protection server of the enterprise network, a specially-coded email message from an authorized user via a device in a network external to the enterprise network, the specially-coded email message providing an instruction for performing a predefined data protection operation on computing assets in the enterprise network, the computing assets on the enterprise network being remote from the device used by the authorized user to transmit the specially-coded email message and the data protection server;
parse, by the data protection server, the specially-coded email message to identify a first phrase in a subject field of the message and a second phrase in a body field of the message, the first phrase indicating one of a plurality of predefined instruction modes and the second phrase indicating the instruction for performing the predefined data protection operation, the instruction being one of a plurality of predefined instructions that are configured for the instruction mode;
initiate, by the data protection server, the predefined data protection operation on the computing assets based upon the instruction in the specially-coded email message; and
send, by the data protection server, a status update email message to one or more administrators when the data protection server initiates the predefined data protection operation.

11. The computer program product of claim 10, wherein the program code includes further instructions to:
parse the first phrase to extract at least one first instruction element;
match the first instruction element to the one of the plurality of predefined instruction modes;
parse the second phrase to extract at least one second instruction element;
match the second instruction element to the one of the plurality of predefined instructions that are configured for the instruction mode that corresponds to the first instruction element;

construct a command phrase for the data protection server based on the predefined instruction corresponding to the second instruction element; and
initiate the predefined data protection operation based on the command phrase.

12. The computer program product of claim 11, wherein the program code includes further instructions to:
initialize a data structure by storing the plurality of predefined instruction modes, and for each instruction mode, storing a corresponding plurality of predefined instructions.

13. The computer program product of claim 12 wherein the program code includes further instructions to:
identify the predefined instruction mode as a command line instruction (CLI) command instruction mode, wherein the second instruction element is a command line instruction formatted for direct execution by the data protection server.

14. The computer program product of claim 12 wherein the program code includes further instructions to:
identify the predefined instruction mode as a TEXT command instruction mode, wherein the second instruction element is a plain text instruction that must be interpreted by an application programming interface.

15. A system for controlling data protection operations of an enterprise network, the system comprising:
a processor; and
one or more stored sequences of instructions which, when executed by the processor, cause the processor to carry out the steps of:
receive, at an email agent of a data protection server of the enterprise network, a specially-coded email message from an authorized user via a device in a network external to the enterprise network, the specially-coded email message providing an instruction for performing a predefined data protection operation on computing assets in the enterprise network, the computing assets on the enterprise network being remote from the device used by the authorized user to transmit the specially-coded email message and the data protection server;
parse, by the data protection server, the specially-coded email message to identify a first phrase in a subject field of the message and a second phrase in a body field of the message, the first phrase indicating one of a plurality of predefined instruction modes and the second phrase indicating the instruction for performing the predefined data protection operation, the instruction being one of a plurality of predefined instructions that are configured for the instruction mode;
initiate, by the data protection server, the predefined data protection operation on the computing assets based upon the instruction in the specially-coded email message; and
send, by the data protection server, a status update email message to one or more administrators when the data protection server initiates the predefined data protection operation.

16. The system of claim 15, wherein a data structure is initialized by storing the plurality of predefined instruction modes, and for each instruction mode, storing a corresponding plurality of predefined instructions.

17. The system of claim 15, wherein the data protection server is further configured to:

parse the first phrase to extract at least one first instruction element, and match the first instruction element to the one of the plurality of predefined instruction modes;

parse the second phrase to extract at least one second instruction element, and match the second instruction element to the one of the plurality of predefined instructions that are configured for the instruction mode that corresponds to the first instruction element;

construct a command phrase for the data protection server based on the predefined instruction corresponding to the second instruction element; and initiate the predefined data protection operation based on the command phrase.

\* \* \* \* \*